US011630683B2

United States Patent
Tsirkin (10) Patent No.: US 11,630,683 B2
(45) Date of Patent: Apr. 18, 2023

(54) LOW LATENCY LAUNCH FOR TRUSTED EXECUTION ENVIRONMENTS

(71) Applicant: Red Hat, Inc., Raleigh, NC (US)

(72) Inventor: Michael Tsirkin, Westford, MA (US)

(73) Assignee: Red Hat, Inc., Raleigh, NC (US)

( * ) Notice: Subject to any disclaimer, the term of this patent is extended or adjusted under 35 U.S.C. 154(b) by 287 days.

(21) Appl. No.: 16/802,083

(22) Filed: Feb. 26, 2020

(65) Prior Publication Data
US 2021/0263757 A1    Aug. 26, 2021

(51) Int. Cl.
G06F 9/455    (2018.01)
H04L 9/08    (2006.01)
G06F 21/53    (2013.01)
G06F 21/57    (2013.01)
G06F 21/62    (2013.01)

(52) U.S. Cl.
CPC ...... G06F 9/45537 (2013.01); G06F 9/45558 (2013.01); G06F 21/53 (2013.01); G06F 21/57 (2013.01); G06F 21/62 (2013.01); H04L 9/0894 (2013.01); G06F 2009/45562 (2013.01); G06F 2009/45575 (2013.01); G06F 2009/45587 (2013.01)

(58) Field of Classification Search
CPC ............. G06F 9/45537; G06F 9/45558; G06F 21/53; G06F 21/57; G06F 21/62; G06F 21/44; G06F 21/51; G06F 21/74; G06F 2009/45562; G06F 2009/45575; G06F 2009/45587; H04L 9/0894; H04L 9/0897
See application file for complete search history.

(56) References Cited

U.S. PATENT DOCUMENTS

| | | | |
|---|---|---|---|
| 8,954,965 | B2 | 2/2015 | Novak et al. |
| 9,124,563 | B2 | 9/2015 | Castillo et al. |
| 9,425,965 | B2 | 8/2016 | Baumann et al. |
| 9,607,298 | B2 | 3/2017 | Brudnicki et al. |
| 2008/0307020 | A1* | 12/2008 | Ko .................. G06F 11/1469 |
| 2014/0007087 | A1 | 1/2014 | Scott-Nash et al. |
| 2018/0212940 | A1 | 7/2018 | Novak |

(Continued)

FOREIGN PATENT DOCUMENTS

WO    WO 2019089403 A1    5/2019

OTHER PUBLICATIONS

Robert Buhren, Christian Werling, Jean-Pierre Seifert; "Insecure Until Proven Updated: Analyzing AMD SEV's Remote Attestation"; Technische Universitt Berlin, Security in Telecommunications; Hasso Plattner Institute, Potsdam; Technische Universitt Berlin, Security in Telecommunications | Sep. 2, 2019 | pp. 1-13.

(Continued)

Primary Examiner — Han Yang
(74) Attorney, Agent, or Firm — K&L Gates LLP (57) ABSTRACT

A system includes an application trusted execution environment ("TEE") instance and an escrow TEE instance. The escrow TEE instance is hosted along with the application TEE instance and is outside the control of a TEE instance owner. The system also includes a server, which is configured to receive a request to start the application TEE instance. The server is also configured to launch the escrow TEE instance. The escrow TEE instance is validated by the TEE instance owner. Additionally, the escrow TEE instance is configured to obtain a key for the application TEE instance, validate the application TEE instance, and provide the key to the application TEE instance.

20 Claims, 6 Drawing Sheets

(56) References Cited

U.S. PATENT DOCUMENTS

| | | | |
|---|---|---|---|
| 2019/0042759 A1 | 2/2019 | Smith et al. | |
| 2019/0102555 A1 | 4/2019 | Novak et al. | |
| 2019/0140846 A1* | 5/2019 | Moore | H04L 9/3265 |
| 2019/0155728 A1 | 5/2019 | Ferguson et al. | |
| 2019/0243950 A1 | 8/2019 | Soriente et al. | |
| 2020/0167503 A1* | 5/2020 | Wei | G06F 21/64 |
| 2020/0257814 A1* | 8/2020 | El-Moussa | G06F 21/6218 |
| 2021/0266148 A1* | 8/2021 | Tsirkin | H04L 9/3265 |
| 2021/0303734 A1* | 9/2021 | Tsirkin | H04L 9/0894 |
| 2021/0409199 A1* | 12/2021 | Tsirkin | G06F 9/45558 |

OTHER PUBLICATIONS

Advanced Micro Devices, Inc.; "Secure Encrypted Virtualization API—Version 0.16"; Publication # 55766 | Revision: 3.06 | Feb. 2018 | pp. 1-99.

Joseph I. Choi and Kevin R. B. Butler; "Secure Multiparty Computation and Trusted Hardware: Examining Adoption Challenges and Opportunities"; Department of Computer and Information Science and Engineering, University of Florida, USA | vol. 2019 | Article ID 1368905 | Apr. 2, 2019 | 28 pages.

David Kaplan, Jeremy Powell, Tom Woller; "AMD Memory Encryption"; © 2016 Advanced Micro Devices, Inc.; Apr. 21, 2016; 12 Pages.

Brian McGillion, Tanel Dettenborn, Thomas Nyman, N. Asokan; "Open-TEE—An Open Virtual Trusted Execution Environment" | Intel Collaborative Research Institute for Secure Computing (ICRI-SC) at Aalto University, Finland; Aalto University and University of Helsinki, Finland | Jun. 30, 2015 | 11 Pages.

Jianping Zhu, Rui Hou , XiaoFeng Wang, Wenhao Wang, Jiangfeng Cao, Lutan Zhao, Fengkai Yuan, Peinan Li, Zhongpu Wang, Boyan Zhao, Lixin Zhang, Dan Meng; "Enabling Privacy-Preserving, Compute- and Data-Intensive Computing using Heterogeneous Trusted Execution Environment" | State Key Laboratory of Information Security, Institute of Information Engineering, CAS and University of Chinese Academy of Sciences; Indiana University Bloomington; Institute of Computing Technology, CAS | Accessed on or before Feb. 26, 2020 | 16 Pages.

* cited by examiner

LOW LATENCY LAUNCH FOR TRUSTED EXECUTION ENVIRONMENTS

BACKGROUND

Trusted execution environments, such as trusted virtual machine may be used to emulate all or a portion of a computer system. The trusted execution environments allow running various software modules, for example, multiple operating systems, concurrently and in isolation from other software modules, on one or more interconnected physical computer systems. Additionally, trusted execution environments may, for example, allow for consolidating multiple physical servers into one physical server running multiple guest virtual machines in order to improve the hardware utilization rate.

Virtualization may be achieved by running a software layer, often referred to as a hypervisor, above the hardware and below the trusted execution environment, such as guest virtual machines or containers. A hypervisor may run directly on the server hardware without an operating system beneath it or as an application running on a traditional operating system. A hypervisor may virtualize the physical layer and provide interfaces between the underlying hardware and trusted execution environments. In some cases, the trusted execution environments may be encrypted for security purposes. Additionally, validation or attestation of launched trusted execution environments may occur for security purposes.

SUMMARY

The present disclosure provides new and innovative systems and methods for low latency launch for trusted execution environments. In an example, a system includes an application trusted execution environment ("TEE") instance and an escrow TEE instance. The escrow TEE instance is hosted along with the application TEE instance and is outside the control of a TEE instance owner. The system also includes a server, which is configured to receive a request to start the application TEE instance. The server is also configured to launch the escrow TEE instance. The escrow TEE instance is validated by the TEE instance owner. Additionally, the escrow TEE instance is configured to obtain a key for the application TEE instance, validate the application TEE instance, and provide the key to the application TEE instance.

In an example, a method includes receiving, by a server, a request to start an application TEE instance. The server launches an escrow TEE instance that is hosted along with the application TEE instance and is outside the control of a TEE instance owner. Additionally, the escrow TEE instance is validated by the TEE instance owner. The escrow TEE instance obtains a key for the application TEE instance, validates the application TEE instance, and provides the key to the application TEE instance.

In an example, a non-transitory machine-readable medium stores code, which when executed by a processor is configured to receive a request to start an application TEE instance. The non-transitory machine-readable medium is also configured to launch an escrow TEE instance that is hosted along with the application TEE instance and is outside the control of a TEE instance owner. The escrow TEE instance is validated by the TEE instance owner. Additionally, the non-transitory machine-readable medium is configured to obtain a key for the application TEE instance, validate the application TEE instance, and provide the key to the application TEE instance.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Techniques are disclosed for providing low latency launching for trusted execution environments, such as a virtual machines ("VMs"), containers and enclaves. Modern hardware supports trusted execution environment (TEE) techniques where a supervisor of a host computer does not have access to memory of a specific TEE, such as a trusted container or a trusted virtual machine or a trusted software enclave running on the host computer. For example, the supervisor may lack access to the memory of the TEE because the memory is protected by host hardware or host firmware. Memory encryption is one such technique to protect the memory of the TEE. In an example, encrypted memory may be used to support and protect running sensitive workloads in the cloud.

Launching a TEE instance, such as a trusted container, by a cloud provider typically involves using a secret that is private to the TEE instance owner and unavailable to the cloud provider. For example, a disk image of the TEE instance (e.g., disk image of the trusted container) may be encrypted with a secret key. However, providing this secret to the TEE instance (e.g., trusted container) presents a challenge. One way to provide the secret to the TEE instance is by having the host hardware or the host firmware first provide a measurement (e.g., cryptographic measurement) of the TEE instance owner. The measurement (e.g., cryptographic measurement) may be used for attestation or validation to ensure that the TEE instance runs under a trusted environment and is protected from the supervisor or hypervisor. After verifying that the TEE instance runs under a trusted environment and is protected from the supervisor or hypervisor, the TEE instance owner's secret is encrypted and forwarded to the TEE instance. For example, the secret may be provided to a trusted container in an encrypted form and in a container specific way.

However, providing the secret to the TEE instance in this way typically requires the TEE instance owner to maintain a service (e.g., attestation service) for verifying the measurement and providing the encrypted secret. Additionally, the service (e.g., attestation service) is typically required to be accessible to the cloud provider, but outside of the cloud provider's control. In an example, the service is envisioned to be hosted on the TEE instance owner's private cloud. However, hosting the service on the TEE instance owner's private cloud is inappropriate for workloads that launch and shut down TEE instances (e.g., trusted containers) at a high rate. For example, should the private cloud become unavailable, the ability to launch new TEE instances would become unavailable. Additionally, if the private cloud slows down and in unable to serve requests, the ability to launch new TEE instances would be halted and unavailable until the private cloud is again able to serve requests.

Providing attestation services through a private cloud often requires that the TEE instances are not treated as "cattle" where they are started up and shut down at will. Instead, the TEE instances are treated as "pets" and carefully migrated live without shutting down. However, live migration increases costs for the cloud providers and the TEE instance owners. For example, treating the TEE instances as "pets" that are migrated live increases hardware utilization and creates additional overhead (e.g., due to successive iterations of memory pre-copying that consumes extra CPU cycles on both source and destination servers).

Another technique for providing attestation services to TEEs is to use a quoting TEE instance (e.g., quoting enclave) that runs on the same platform as the TEE instances (e.g., enclaves) being attested. The quoting enclave provides attestation services to the application enclaves by signing their attestation reports. For example, the quoting enclave may verify attestation reports for the platform and the quoting enclave may hold the platforms attestation key. In an example, multiple attesting enclaves may create respective attestation reports for the quoting enclave and the quoting enclave verifies the report and signs the report with the attestation key. Then, off-platform tenants may go through a verification process to obtain the attestation information. For example, the verification of a quote by an off-platform tenant involves verifying that a Provisioning Certification Key ("PCK") embedded in the quote is valid. For example, verification of the quote may be achieved by using the PCK certificate chain obtained from a manufacturer associated with the enclave (e.g., Intel as a SQX processor that utilizes quoting enclaves). Then, verifying the key associated with the PCK certification is the one that signed the platform's attestation key (e.g., signed the hash of the platform's attestation key). Verification of the quote also includes verifying that the attestation key was the one that signed the quote and also verifying that the hash of the attestation key embedded in the quote is correct.

To eliminate the need of live migration, to reduce the reliance on private cloud attestation services, to eliminate the numerous verification steps associated with quoting enclaves, and to improve the latency of launching TEE instances (e.g., containers, virtual machines or enclaves), when a TEE instance owner requests starting a TEE instance, the cloud provider launches an escrow TEE instance if one is not already running. The escrow TEE instance is launched in the same datacenters as the TEE instances and the escrow TEE instance is owned and authenticated by the same TEE instance owner or guest owner.

The escrow TEE instances may be launched normally and are treated as "pets." Additionally, the escrow TEE instances are provided the key(s) for their respective application TEE instances. For example, the escrow TEE instances may be provided the key on the escrow disk image or the escrow TEE instances may retrieve the key from the TEE instance owner or guest owner. Then, the escrow TEE instance can validate application TEE instances and provide secrets to the application TEE instances without having to rely on external attestation services on a private cloud. For example, a private cloud may go off-line or the cloud's attestation services may slow down thereby causing an interruption to completing start-up of application TEE instances after launch. If the private cloud goes off-line for an extended period of time, the application TEE instances may be entirely prevented from starting-up and serving application requests, causing delays or even a crash of the application on the cloud.

Furthermore, re-using trusted TEE containers for attestation allows low latency and high availability without reducing security. The systems and methods described herein includes escrow TEE instances that hold a secret for validating guests (e.g., application TEE instances) as opposed to systems that attest each guest (e.g., application TEE instance) through communication with a remote tenant. Additionally, the escrow TEE instances (e.g., escrow containers) do not have to run on the same platform as the application TEE instances (e.g., application containers) being launched since the escrow TEE instances do not rely on the platform to provide security as with the quoting enclave example described above. Furthermore, with a quoting enclave, the tenant still needs to be contacted to have the tenant verify the attestation and supply the secret. Lastly, the systems and methods described herein do not require any special machinery for the escrow TEE instance (e.g., escrow container) because the escrow TEE instance is a trusted TEE instance like the application TEE instance or any other trusted TEE instance and is treated as such.

Figure 1:
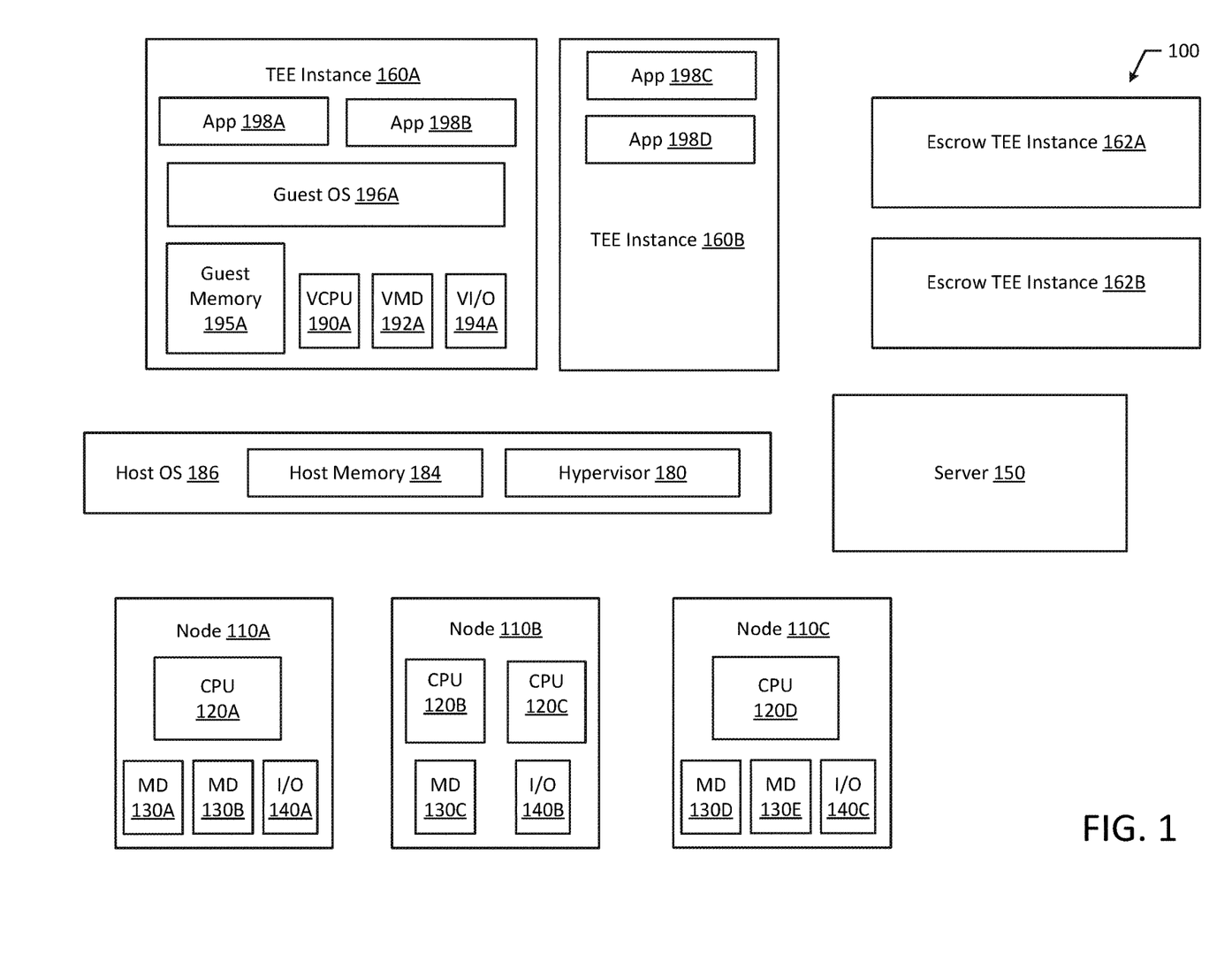
FIG. 1 illustrates a block diagram of an example computer system according to an example embodiment of the present disclosure.

FIG. 1 depicts a high-level component diagram of an example computing system 100 in accordance with one or more aspects of the present disclosure. The computing system 100 may include an operating system (e.g., host OS 186), one or more TEEs (e.g., TEE instances 160A-B and escrow TEE instances 162A-B), a cloud provider (e.g., server 150), and nodes (e.g., nodes 110A-C).

An application TEE instance (e.g., TEE instance 160A) may be a virtual machine, container, enclave, etc. and may include a guest OS, guest memory, a virtual CPU (VCPU), virtual memory devices (VMD), and virtual input/output devices (VI/O). For example, TEE instance 160A may include guest OS 196A, guest memory 195A, a virtual CPU 190A, a virtual memory devices 192A, and virtual input/output device 194A. Virtual machine memory 195A may include one or more memory pages. Similarly, TEE instance 160B may include a guest OS, guest memory, a virtual CPU, virtual memory devices, and virtual input/output devices.

The computing system 100 may also include a supervisor or hypervisor 180 and host memory 184. The supervisor or hypervisor 180 may manage host memory 184 for the host operating system 186 as well as memory allocated to the TEEs (e.g., TEE instances 160A-B and escrow TEE instances 162A-B) and guest operating systems (e.g., guest OS 196A such as guest memory 195A provided to guest OS 196A. Host memory 184 and guest memory 195A may be divided into a plurality of memory pages that are managed by the supervisor or hypervisor 180. Guest memory 195A allocated to the guest OS 196A may be mapped from host memory 184 such that when an application 198A-D uses or accesses a memory page of guest memory 195A, the guest application 198A-D is actually using or accessing host memory 184.

In an example, a TEE instance (e.g., TEE instance 160A-B), such as a virtual machine, container or enclave may execute a guest operating system 196A and run applications 198A-B which may utilize the underlying VCPU 190A, VMD 192A, and VI/O device 194A. One or more applications 198A-B may be running on a TEE, such as virtual machine, under the respective guest operating system 196A. TEEs (e.g., TEE instances 160A-B and escrow TEE instances 162A-B, as illustrated in FIG. 1) may run on any type of dependent, independent, compatible, and/or incompatible applications on the underlying hardware and OS. In an example, applications (e.g., App 198A-B) run on a TEE, such as a virtual machine, and may be dependent on the underlying hardware and/or OS 186. In another example, applications 198A-B run on a TEE, such as a virtual machine, and may be independent of the underlying hardware and/or OS 186. For example, applications 198A-B running on a first TEE instance 160A may be dependent on the underlying hardware and/or OS 186 while applications (e.g., application 198C-D) running on a second TEE instance 160B are independent of the underlying hardware and/or OS 186A. Additionally, applications 198A-B running on TEE instance 160A may be compatible with the underlying hardware and/or OS 186. In an example, applications 198A-B running on a TEE instance 160A may be incompatible with the underlying hardware and/or OS 186.

The cloud provider (e.g., server 150) may host both the application TEE instances 160A-B and the escrow TEE instances 162A-B alongside each other. For example, the cloud provider may launch the escrow TEE instances 162A-B on the same server 150 or in the same datacenters as the application TEE instance(s) 160A-B. For example, the server 150 may receive a request to start an application, which may include one or more application TEE instances 160A-B. Then, the server 150 may launch escrow TEE instance(s) 162A-B such that the escrow TEE instance(s) 162A-B are hosted alongside the application TEE instance(s) 160A-B. However, the escrow TEE instance(s) are outside the control of a TEE instance owner, but are validated by the TEE instance owner.

The server 150 may include hardware, such as processor(s), memory, hard drives, network adapters for network connection, etc. For example, server 150 may include many of the same hardware components as nodes 110A-C.

After the escrow TEE instance(s) are launched, the escrow TEE instance(s) are configured to obtain a key for the application TEE instance(s) 160A-B, validate the application TEE instance(s) 160A-B and provide the key to the application TEE instance(s) upon validation (e.g., attestation). For example, to eliminate the need of live migration and to improve the latency of launching TEE instances (e.g., containers, virtual machines or enclaves), the cloud provider may launch an escrow TEE instance (if one is not already running) when a TEE instance owner requests starting an application TEE instance. The escrow TEE instance is launched in the same datacenters and therefore the attestation or validation of application TEE instances may be achieved without further relying on attestation services maintained on private clouds.

Specifically, by launching escrow TEE instances 162A-B that are capable of providing validation (e.g., attestation) services, the escrow TEE instance(s) 162A-B can validate application TEE instance(s) 160A-B without the risks associated with a private cloud going off-line or slowing down. For example, a private cloud that would otherwise provide the validation or attestation services may go off-line or slow-down, which may prevent attestation of application TEE instance(s) 160A-B until the private cloud comes back online. Without validating or attesting the newly launched application TEE instance(s) 160A-B, the application TEE instance(s) 160A-B are prevented from fully starting-up and are prevented from performing runtime services or serving application requests. Furthermore, the escrow TEE instance(s) 162A-B may advantageously be reused for validation (e.g., attestation), which advantageously provides the system with low latency and high availability without reducing security.

The escrow TEE instance(s) 162A-B may be enclaves that provide validation (e.g., attestation) services for containers or virtual machines. In another example, the escrow TEE instance(s) 162A-B may be virtual machines that provide validation (e.g., attestation) services for containers or enclaves. Therefore, the system advantageously provides low latency launch capabilities without requiring the escrow TEE instance(s) 162A-B to run on the same platform as the application TEE instance(s) 160A-B being launched, which provides additional flexibility while maintaining security. For example, the systems and methods described herein do not rely on the platform to provide security, which is typically required when using quoting enclaves. Furthermore, using a quoting enclave requires contacting the tenant to perform the validation, which as described above, may pose a problem if the tenant is unable to be reached (e.g., tenant's attestation services going off-line or slowing down).

The computer system 100 may include one or more nodes 110A-C. Each node 110A-C may in turn include one or more physical processors (e.g., CPU 120A-D) communicatively coupled to memory devices (e.g., MD 130A-D) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. TEE instances 160A-B may be provisioned on the same host or node (e.g., node 110A) or different nodes. For example, TEE instance 160A and TEE instance 160B may both be provisioned on node 110A. Alternatively, TEE instance 160A may be provided on node 110A while TEE instance 160B is provisioned on node 110B.

As used herein, physical processor, processor or CPU 120A-D, refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory device 130A-D refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors (e.g., CPUs 120A-D) may be interconnected using a variety of techniques, ranging from a point-to-point processor interconnect, to a system area network, such as an Ethernet-based network. Local connections within each node, including the connections between a processor (e.g., CPU 120A-D) and a memory device 130A-D may be provided by one or more local buses of suitable architecture, for example, peripheral component interconnect (PCI).

Figure 2:
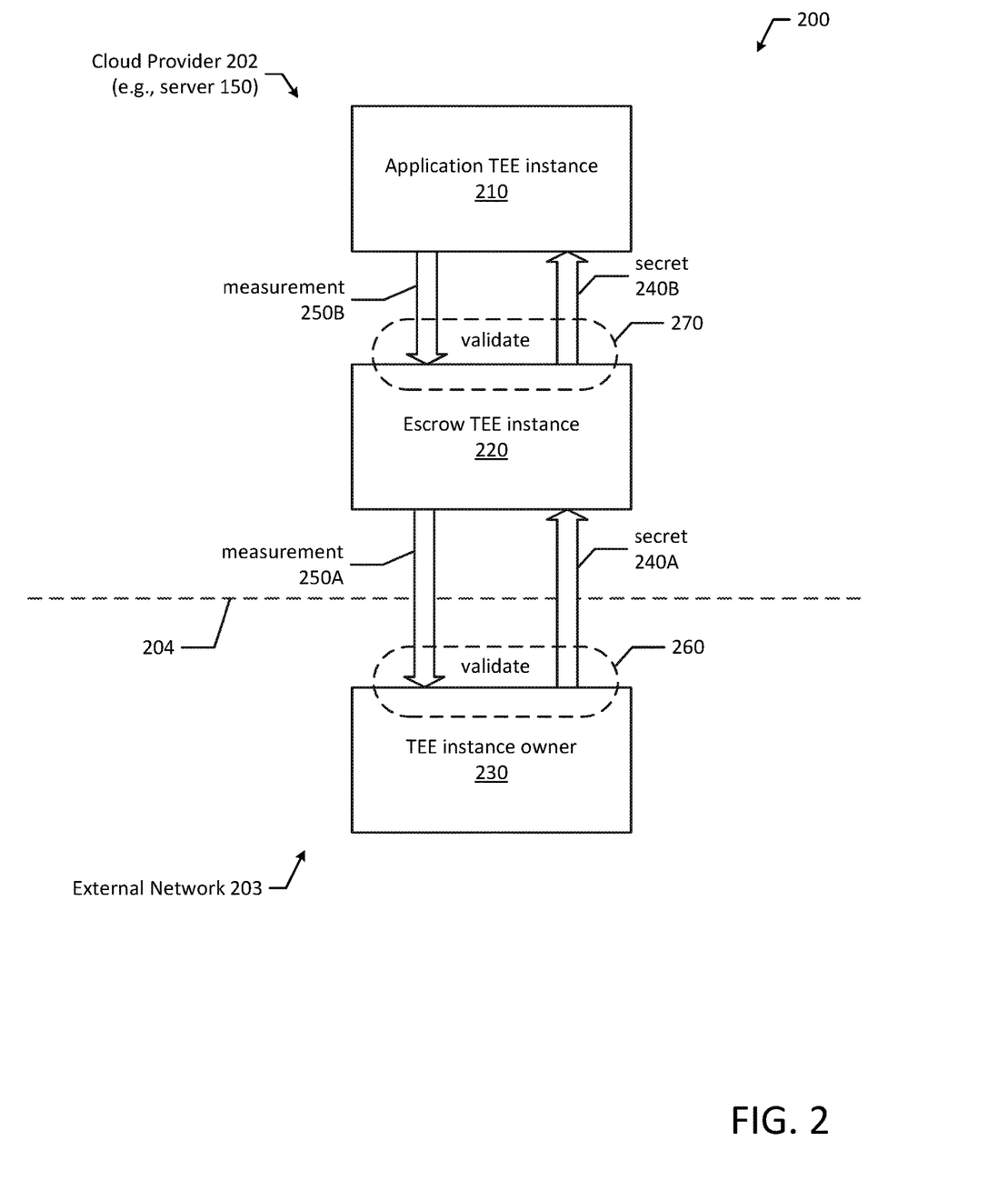
FIG. 2 illustrates a block diagram of an example low latency launch system according to an example embodiment of the present disclosure.

FIG. 2 illustrates a block diagram of an example low latency TEE launching system 200. As illustrated in FIG. 2, a TEE instance owner 230 may request starting an application instance (e.g., application TEE instance 210). In an example, an application may include multiple TEE instances (e.g., each TEE instance provides a service or microservice that makes up a portion of the application). For example, an application may consist of a number of trusted application containers. Upon requesting to start an application instance (e.g., application TEE instance 210), a cloud provider 202, such as server 150, may launch a trusted escrow TEE instance 220. The cloud provider 202 may launch the trusted escrow TEE instance 220 in the same datacenters as the application TEE instance(s) 210.

The escrow TEE instance may be validated by the TEE instance owner 230 through a validation process 260. For example, a measurement 250A of the escrow TEE instance 220 may be obtained and if the measurement is validated by the TEE instance owner 230, the TEE instance owner may provide a key or secret 240A to the escrow TEE instance 220. The escrow TEE instances may be launched normally and are treated as "pets." Additionally, the escrow TEE instances are provided the key for their respective application TEE instances. For example, the escrow TEE instances may be provided the key on the escrow disk image or the escrow TEE instances may retrieve the key from the TEE instance owner 230. In an example, the TEE instance owner 230 may originally provide secret 240A over a network through network interface 204 (e.g., from an external network 203 or a private cloud separate from cloud provider (e.g., server 150)). Additionally, the TEE instance owner 230 may provide a validation process 260 via the external network 203. Alternatively, the TEE instance owner may be executing within the cloud of cloud provider 202.

Then, the escrow TEE instance 220 can validate (e.g., via validation process 270) application TEE instances (e.g., application TEE instance 210) and provide secrets 240B to the application TEE instance 210 after validation. For example, the escrow TEE instance 220 may receive and validate a measurement 250B of the application TEE instance 210. After validating (e.g., via validation process 270), the escrow TEE instance 200 may provide the key or secret 240B to the application TEE instance 210 such that the application TEE instance 210 can finish launching. The validation process 270 between the escrow TEE instance 220 and the application TEE instance 210 advantageously occurs without the risks associated with a private cloud going off-line or slowing down since both the escrow TEE instance 220 and the application TEE instance 210 are hosted on the same server 150 or datacenters. Furthermore, re-using trusted TEE instances (e.g., escrow TEE instance 220) for attestation allows low latency and high availability without reducing security.

For example, as illustrated in FIG. 2, escrow TEE instance 220 holds secret 240B for launching application TEE instance(s) 210 as opposed to attesting each application TEE instance 210 via a remote tenant or private cloud. Measurements 250A-B described above may be cryptographic measurements that identify characteristics of the application TEE instance(s) 210 such as the type of application TEE instance 210, version of the TEE instance 210, description of software components loaded into the TEE instance 210, etc. Additional examples of cryptographic measurements are described in more detail below.

Figure 3:
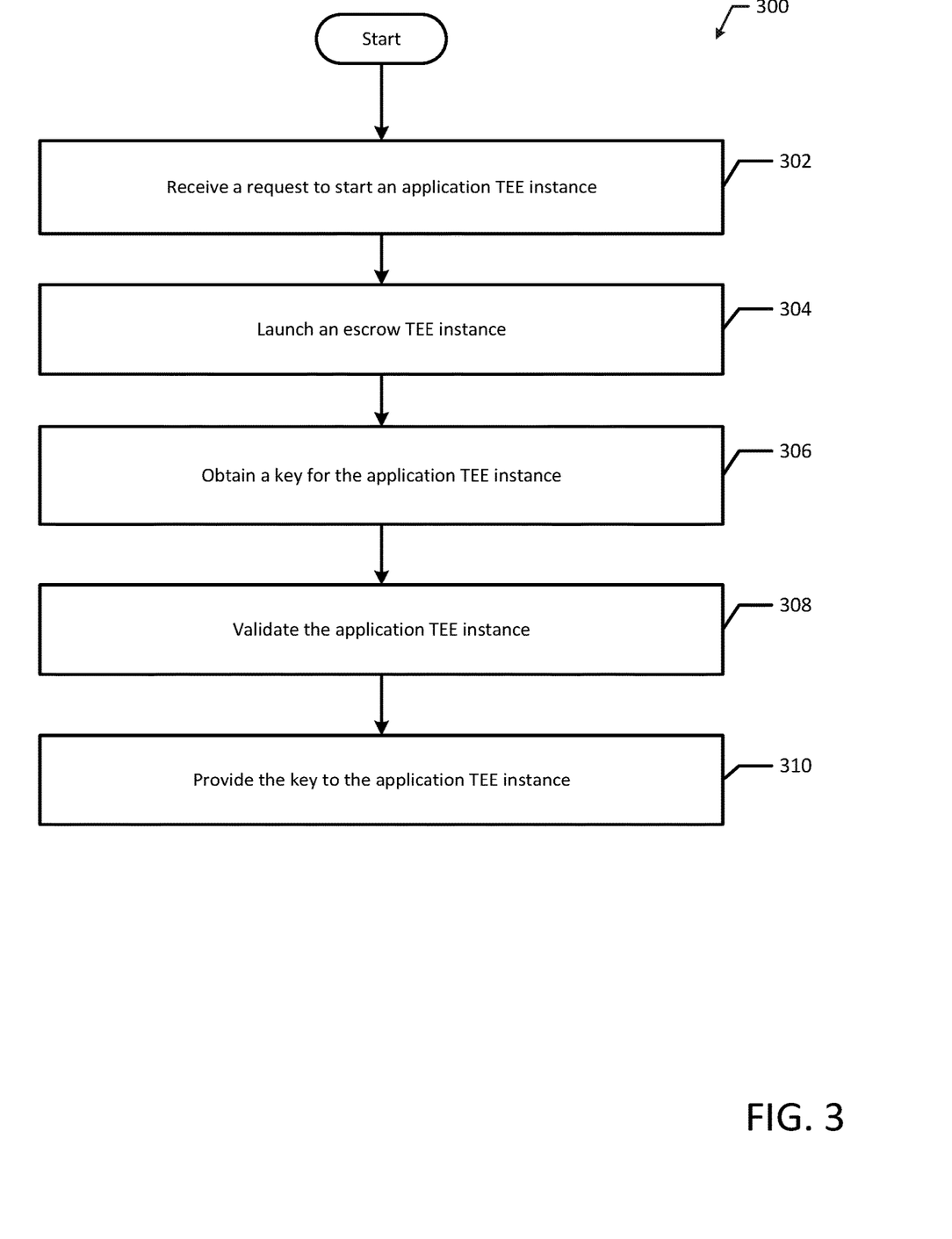
FIG. 3 illustrates a flowchart of an example process for low latency launching of trusted execution environments according to an example embodiment of the present disclosure.

FIG. 3 illustrates a flowchart of an example method 300 for low latency launching of TEEs in accordance with an example of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, blocks may be repeated, and some of the blocks described are optional. The method 300 may be performed by processing logic that may comprise hardware (circuitry, dedicated logic, etc.), software, or a combination of both.

In the illustrated example, method 300 includes receiving a request to start an application TEE instance (block 302). For example, a server 150 may receive a request to start an application TEE instance 210. Requests to start an application TEE instance 160, such as a container, virtual machine, enclave, etc. may be due to higher network traffic where additional application instances are necessary to service the higher load. It should be appreciated that application TEE instance 210 of FIG. 2 may represent TEE instance(s) 160A or 160B of FIG. 1, which may each be referred to generally as application TEE instance 210.

Method 300 also includes launching an escrow TEE instance (block 304). For example, the server 150 may launch the escrow TEE instance 220 that is hosted along with the application TEE instance 210, but is outside the control of a TEE instance owner 230. Additionally, the escrow TEE instance 220 may originally be validated by the TEE instance owner 230. It should be appreciated that escrow TEE instance 220 of FIG. 2 may represent escrow TEE instances 162A-B of FIG. 1, which may each be referred to generally as escrow TEE instance 220.

Method 300 includes obtaining a key for the application TEE instance (block 306). For example, the escrow TEE instance 220 may obtain a key or secret 240A for the application TEE instance 210. In an example, the key or secret 240A may be provided by the TEE instance owner 230 (e.g., sent to the escrow TEE instance 220). The key or secret 240A may also be retrieved by the escrow TEE instance 220. In another example, the escrow TEE instance 220 may be launched and provisioned with the key or secret 240A. The key or secret 240A may be on the escrow disk image. The key or secret 240A may involve symmetric encryption or asymmetric encryption. Symmetric encryption is an encryption process that uses a single key for both encryption and decryption. In symmetric encryption, the same key is available to multiple entities (e.g., nodes, TEE instances 210, etc.). Asymmetric encryption uses key pairs or key-secret pairs that may each include a private key and a public key. In an example, the private key is known only to a respective entity (e.g., escrow TEE instance 220), and the public key is known to a group of entities in the network (e.g., each application TEE instance 210). An application TEE instance 210 may use the public key to encrypt data, and the encrypted data can be decrypted using the escrow TEE instances 220 private key.

The encryption and decryption may utilizing hashing functions such as the Secure Hash Algorithm ("SHA") (e.g., SHA-128, SHA-256, etc.) or other hashing functions such as MD5. For example, the key or secret 240A may appear to be a random string of numbers and letters (e.g., 140FA9Z425ED694R018019B492). Additionally, the encryption and decryption processes may be performed according to the Advanced Encryption Standard ("AES"). AES is based on a design principle known as a substitution-permutation network, and may utilize keys with a key size of 128, 192, or 256 bits.

Then, method 300 includes validating the application TEE instance (block 308). For example, the escrow TEE instance 220 may validate the application TEE instance 210. A validation process 270 may include obtaining a cryptographic measurement associated with the application TEE instance 210. The cryptographic measurement may include measurements of files, BIOS, bootloaders, virtual memory, components, images, internal configurations, current software or applications run by the TEE, etc. For example, components of the boot of the application TEE instance 210 may be cryptographically measured (e.g., each boot component may be measured by computing the hash values of byte arrays representing the boot components). The measured values of the boot components may then be used to decide if the application TEE instance 210 can be trusted. Additionally, the measurement or hash may represent a fingerprint of the measured files.

In another example, the cryptographic measurement may include a measurement value that is a hash value of the files associated with the application TEE instance 210. In another example, a cryptographic measurement may be taken from one or more of the application TEE images. Additionally, the measurement may be compared to integrity records or attestation records from a reference measurement. In some cases, the measurement may also indicate the origin of the measured information, which may help attest that the origin of the information is a trusted source.

Method 300 also includes providing the key to the application TEE instance (block 310). For example, the escrow TEE instance 210 may provide the key or secret 240B to the application TEE instance 210. After receiving the key or secret 240B, the application TEE instance 210 proceeds with start-up. For example, the TEE instance 210 may start performing runtime services on the cloud. The escrow TEE instance 220 may validate additional application TEE instances 210 that are launched on the cloud, which advantageously provides high availability to attestation or validation services without reducing security.

Figure 4A:
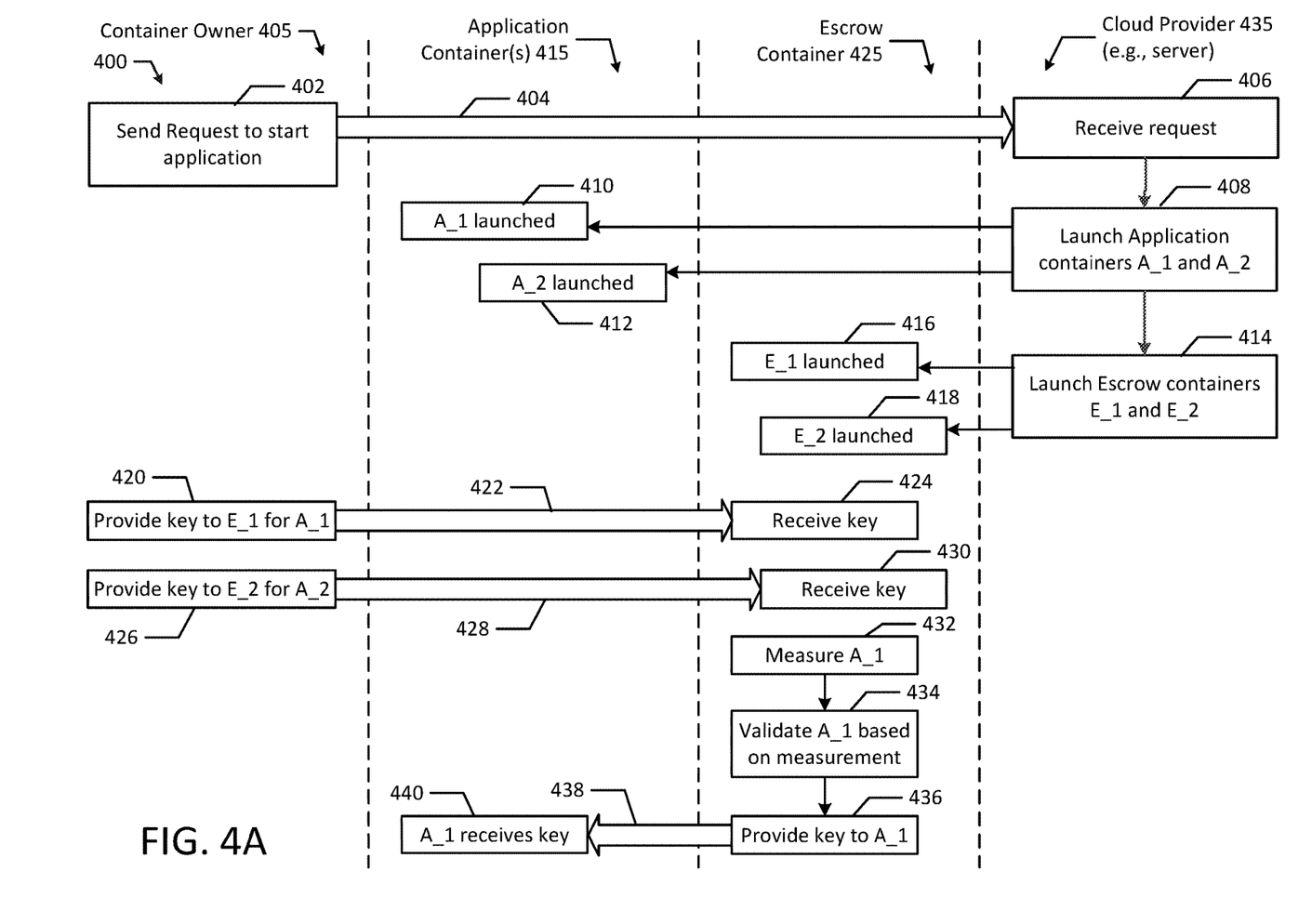
FIGS. 4A and 4B illustrate a flow diagram of an example process for launching application containers according to an example embodiment of the present disclosure.
Figure 4B:
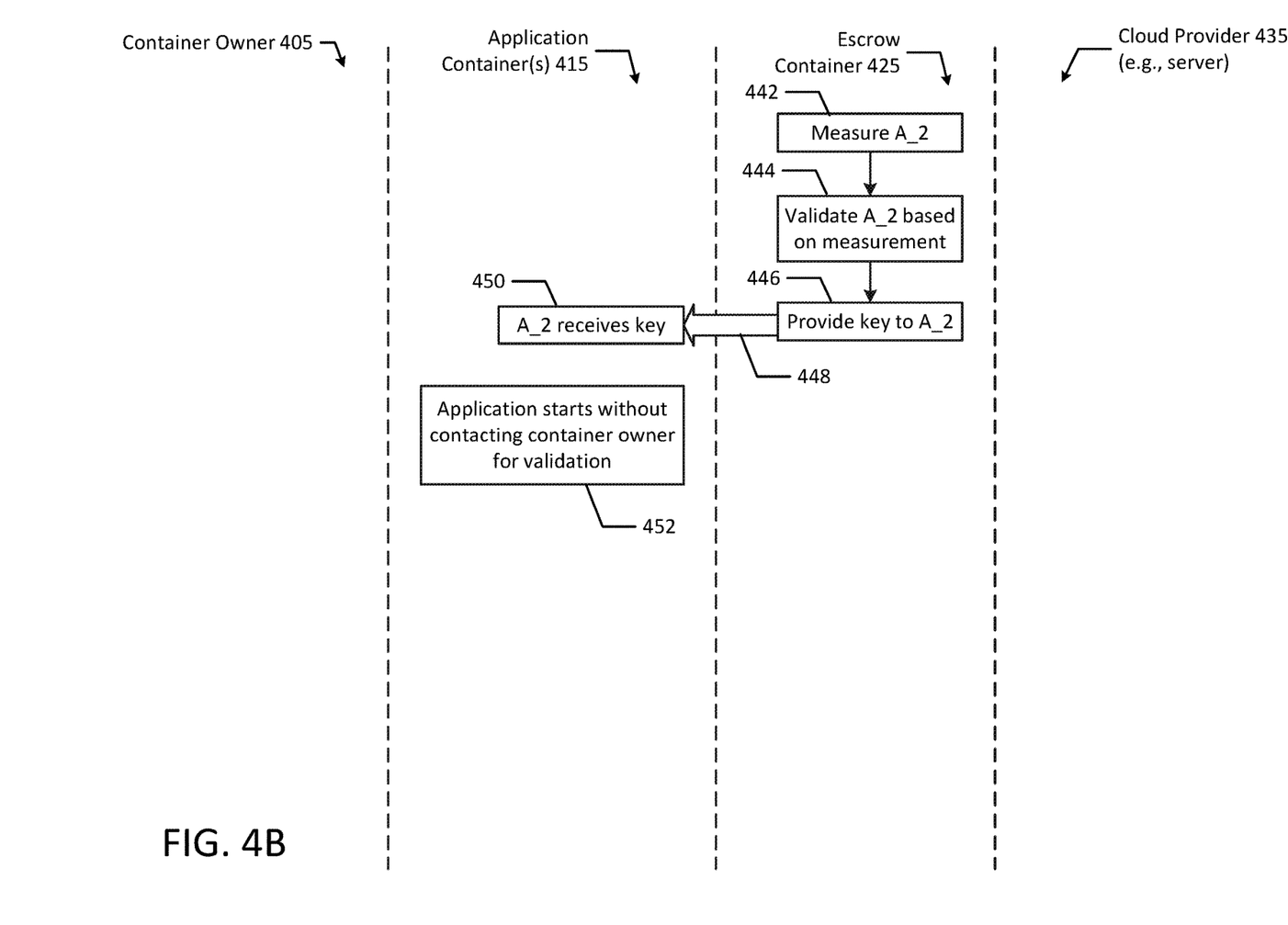

FIGS. 4A and 4B depict a flow diagram illustrating an example method 400 for launching of trusted application containers according to an example embodiment of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise (e.g., circuitry, dedicated logic, etc.), software, or a combination of both. For example, a container owner 405, application container(s) 415, an escrow container 425 and a cloud provider 435 may communicate to perform example method 400.

In the illustrated example, a container owner 405 sends a request 404 to start an application (block 402). The container owner 405 may send a request 404 to start an application due to increased traffic that requires additional application instances to handle the load. In other examples, the request to start the application may be to launch a new version or new release of the application in the cloud. Then, a cloud provider 435 receives the request 404 (block 406). After receiving the request 404, the cloud provider 435 launches application containers 415 (e.g., Application containers "A_1" and "A_2") (block 408). In an example, both application containers "A_1" and "A_2" may represent services, such as microservices that make up an entire application offering. Then, application container "A_1" is launched (block 410) and application container "A_2" is launched (block 412). Even though application containers 415 are launched and running, these containers 415 have not yet been validated and therefore are not allowed to proceed with start-up. For example, validation or attestation may be required to ensure that the application containers 415 are authorized for deployment. For example, validation may provide an endorsement that the application container 415 was launched by a trusted platform and that the application container's code is endorsed by a trusted entity. Allowing an application container 415 to proceed with start-up without validating or attesting the application container 415 may allow untrusted applications (e.g., malicious applications) to start-up and cause security breaches.

After launching the application containers 415, the cloud provider 435 launches escrow containers 415 (e.g., Escrow containers "E_1" and "E_2") (block 414). The escrow containers 425 may be launched and hosted alongside the application containers 415 on the same datacenter. Then, escrow container "E_1" is launched (block 416) and escrow container "E_2" is launched (block 418). Each escrow containers 425 may correspond to a respect application container 415. For example, escrow container "E_1" may correspond to application container "A_1" while escrow container "E_2" corresponds to application container "A_2". In some examples, a single escrow container 425 may be launched to provide attestation services to multiple application containers 415. In an example, escrow containers 425 may be launched simultaneously with the application containers 415 after the receiving request 404. In another example, a check may be performed to determine if appropriate escrow containers 425 have already been launched and are running. For example, during a previous application launch, escrow containers may already be running on the cloud that are capable of providing attestation or validation services for newly launched application containers 415.

Then, the container owner 405 may provide a key 422 to escrow container "E_1" for application container "A_1" (block 420). In an example, the key 422 or secret may be provided on the escrow disk image and in some scenarios the escrow container "E_1" may be provisioned with the key 422 when the container is launched. Escrow container "E_1" receives the key 422 (block 424). In other examples, the escrow container "E_1" may retrieve the key 422. The key 422 may be encrypted. In other examples, the key may be a secret or a key-secret pair. The key 422 or secret may involve symmetric encryption or asymmetric encryption. With asymmetric encryption, the key 422 may use key pairs or key-secret pairs. In an example, the encryption and decryption may utilizing hashing functions such as the Secure Hash Algorithm ("SHA") (e.g., SHA-128, SHA-256) or MD5. Additionally, the encryption and decryption processes may be performed according to the Advanced Encryption Standard ("AES") and may utilize keys 422 with a key size of 128, 192, or 256 bits.

Similarly, the container owner 405 may also provide a key 428 to escrow container "E_2" for application container "A_2" (block 426). Escrow container "E_2" receives the key 428 (block 430). In an example, the key 428 (like key 422) may be encrypted using various key encryption techniques.

Next, escrow container "E_1" measures application container "A_1" (block 432). For example, escrow container "E_1" may obtain a cryptographic measurement of application container "A_1". The cryptographic measurement may include measurements of files, BIOS, bootloaders, virtual memory, components, images, internal configurations, current software or applications run by the TEE, etc. Based on the cryptographic measurement, escrow container "E_1" validates application container "A_1" (block 434). For example, if the cryptographic measurement produces a measurement value (e.g., hash value) that matches a trusted reference measurement, the escrow container "E_1" may determine that the application container "A_1" is trustworthy.

After validating application container "A_1", the escrow container "E_1" provides the key 438 to the application container "A_1" (block 436). Key 438 may be identical to key 422 but may be stored in a different location than the key 422 that was originally provided by the container owner 405. Then, application container "A_1" receives the key (block 440).

Continuing on FIG. 4B, escrow container "E_2" measures application container "A_2" (block 442). For example, escrow container "E_2" may obtain a cryptographic measurement of application container "A_2", which may include measurements of files, BIOS, bootloaders, virtual memory, components, images, internal configurations, current software or applications run by the TEE, etc. Based on the cryptographic measurement, escrow container "E_2" validates application container "A_2" (block 444). For example, if the cryptographic measurement produces a measurement value (e.g., hash value) that matches a trusted reference measurement, the escrow container "E_2" may determine that the application container "A_2" is trustworthy.

After validating application container "A_2", the escrow container "E_2" provides the key 448 to the application container "A_2" (block 446). Key 448 may be identical to key 422 but may be stored in a different location than the key 428 that was originally provided by the container owner 405. Then, application container "A_2" receives the key 448 (block 440). After each of the application containers 415 have been validated, the application proceeds with start-up without contacting the container owner for validation (block 452). The already launched escrow containers may validate additional application containers without further communication with the container owner. Additionally, method 400 is capable providing validation (e.g., attestation services) for newly launched application containers 415 via various escrow containers 425 hosted by the same cloud provider 435. Validating (e.g., attesting) application containers 415 with escrow containers 425 hosted by the same cloud provider 435 eliminates the added risk associated with relying on a private cloud for attestation services because the private cloud adds another point of failure (e.g., the private going off-line or slowing down). Furthermore, if the private cloud goes off-line, all attestation services may stop completely. Conversely, multiple escrow container 425 may be launched and running at the same time such that if one of the escrow containers 525 crashes or goes off-line, another escrow container 425 may assume the responsibility of validating (e.g., attesting) application containers 415.

Figure 5:
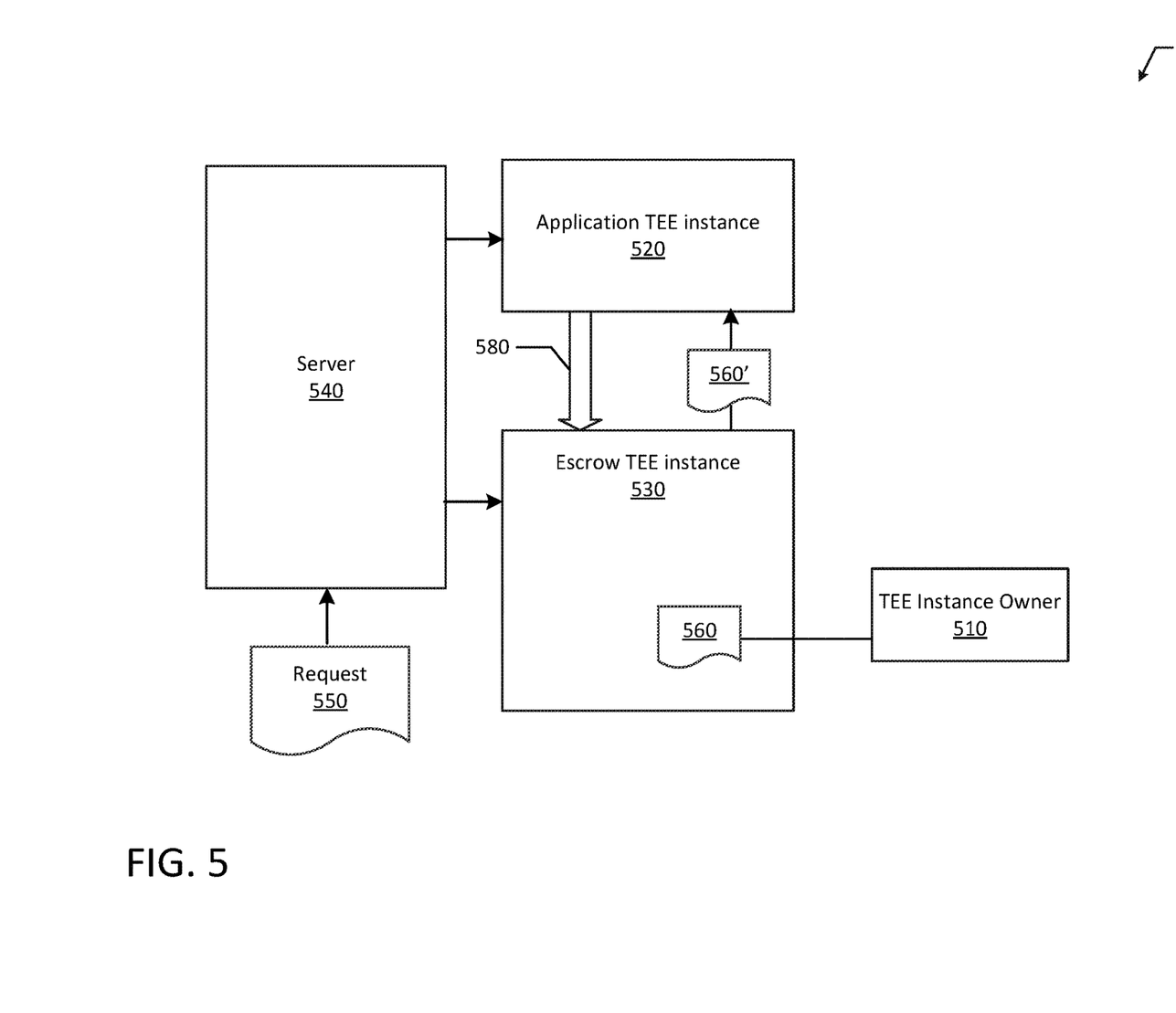
FIG. 5 illustrates a block diagram of an example low latency application TEE launch system according to an example embodiment of the present disclosure.

FIG. 5 is a block diagram of an example low latency application TEE launch system 500 according to an example embodiment of the present disclosure. The system 500 includes an application TEE instance 520 and an escrow TEE instance 530. The escrow TEE instance 530 may be hosted along with the application TEE instance 520 and may be outside the control of a TEE instance owner 510. The system also includes a server 540, which may be configured to receive a request 550 to start the application TEE instance 520. The server 540 may also be configured to launch the escrow TEE instance 530. The escrow TEE instance 530 may be validated by the TEE instance owner. Additionally, the escrow TEE instance 530 may be configured to obtain a key 560 for the application TEE instance 520, validate the application TEE instance 520 (e.g., via a cryptographic measurement 580), and provide the key 560' to the application TEE instance 520. The received key 560' may be the same key 560 that was originally provided to the escrow TEE instance 530, although it may be saved in a different location. The application TEE instance 520 may proceed with start-up after receiving the key 560' and may start providing runtime services.

Therefore, the system 500 advantageously provides low latency launch for application TEE instance(s) 520 without the risk of validation (e.g., attestation) services from a private provider (e.g., private cloud) going off-line or slowing down. When a private cloud's attestation services go off-line, validating newly launched application TEE instances 520 may be completely halted thereby preventing the application TEE instances 520 from fully starting up and performing runtime services (e.g., serving application requests). Relying solely on a private cloud adds another point of failure and may cause the application to perform poorly or even crash if the private cloud slows down or goes off-line.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A system comprising:
   at least one processor;
   at least one memory storing instructions which, when executed by the at least one processor, cause the at least one processor to implement:
   an application trusted execution environment ("TEE") instance; and
   an escrow TEE instance that is hosted alongside the application TEE instance and outside control of a TEE instance owner; and
   a server configured to:
   receive a request to start the application TEE instance, and
   launch the escrow TEE instance upon receiving the request, wherein the escrow TEE instance is validated by the TEE instance owner,
   wherein the escrow TEE instance is configured to:
   obtain a key for the application TEE instance,
   validate the application TEE instance, and
   provide the key to the application TEE instance upon validation, wherein the key is used to secure the application TEE instance.

2. The system of claim 1, wherein the escrow TEE instance is configured to retrieve the key from the TEE instance owner.

3. The system of claim 1, wherein the escrow TEE instance is configured to receive the key from the TEE instance owner.

4. The system of claim 1, wherein the key is provided on a disk image of the escrow TEE instance.

5. The system of claim 4, wherein the disk image is encrypted with the key.

6. The system of claim 1, wherein the escrow TEE instance is configured to take a measurement of the application TEE instance prior to validating the application TEE instance.

7. The system of claim 6, wherein the measurement identifies characteristics of the application TEE instance including at least one of a type of the application TEE instance, version of the application TEE instance, and description of software components loaded into the application TEE instance.

8. The system of claim 6, wherein the measurement further includes an integrity code to validate the measurement.

9. The system of claim 1, wherein at least one of the application TEE instance and the escrow TEE instance is an encrypted virtual machine.

10. The system of claim 1, wherein the application TEE instance is a virtual machine and the escrow TEE instance is an enclave.

11. The system of claim 1, wherein the application TEE instance is an enclave and the escrow TEE instance is a virtual machine.

12. A method comprising:
    receiving, by a server, a request to start an application TEE instance;
    launching, by the server, an escrow TEE instance that is outside control of a TEE instance owner upon receiving the request, wherein the escrow TEE instance is validated by the TEE instance owner;
    obtaining, by the escrow TEE instance, a key for the application TEE instance;
    validating, by the escrow TEE instance, the application TEE instance; and
    providing, by the escrow TEE instance, the key to the application TEE instance upon validation, wherein the key is used to secure the application TEE instance.

13. The method of claim 12, wherein obtaining the key for the application TEE instance includes retrieving the key from the TEE instance owner.

14. The method of claim 12, wherein obtaining the key for the application TEE instance includes receiving the key from the TEE instance owner.

15. The method of claim 12, wherein the key is provided on a disk image of the escrow TEE instance.

16. The method of claim 15, wherein the disk image is encrypted with the key.

17. The method of claim 12, wherein validating the application TEE instance includes taking a measurement of the application TEE instance.

18. The method of claim 17, wherein the measurement identifies characteristics of the application TEE instance including at least one of a type of the application TEE instance, version of the application TEE instance, and description of software components loaded into the application TEE instance.

19. The method of claim 17, wherein at least one of the application TEE instance and the escrow TEE instance is one of an enclave and an encrypted virtual machine.

20. A non-transitory machine-readable medium storing code, which when executed by a processor is configured to:
    receive a request to start an application TEE instance;
    launch an escrow TEE instance that is outside control of a TEE instance owner upon receiving the request, wherein the escrow TEE instance is validated by the TEE instance owner;
    obtain, by the escrow TEE instance, a key for the application TEE instance;
    validate, by the escrow TEE instance, the application TEE instance; and
    provide, by the escrow TEE instance, the key to the application TEE instance upon validation, wherein the key is used to secure the application TEE instance.

* * * * *

UNITED STATES PATENT AND TRADEMARK OFFICE
CERTIFICATE OF CORRECTION

| | |
|---|---|
| PATENT NO. | : 11,630,683 B2 |
| APPLICATION NO. | : 16/802083 |
| DATED | : April 18, 2023 |
| INVENTOR(S) | : Michael Tsirkin |

It is certified that error appears in the above-identified patent and that said Letters Patent is hereby corrected as shown below:

In the Specification

In Column 9, Line 66, replace "comprise (e.g.," with -- comprise hardware (e.g., --.

Signed and Sealed this
Seventeenth Day of October, 2023

Katherine Kelly Vidal
*Director of the United States Patent and Trademark Office*